Oct. 4, 1966 J. R. TRAVIS ETAL 3,277,285

TELEPHONE REGISTERS

Filed Jan. 18, 1963

INVENTORS:
JAMES ROY TRAVIS
JOHN RYE JENSEN
HUBERT HARVEY

Browne, Schuyler & Beveridge
ATTORNEYS 3,277,285
Patented Oct. 4, 1966

3,277,285

TELEPHONE REGISTERS

James Roy Travis, Beeston, Nottingham, England, and John Rye Jensen, Smithfield, New South Wales, and Hubert Harvey, Chatswood, New South Wales, Australia, assignors to Telephone & Electrical Industries Pty. Ltd., Meadowbank, near Sydney, New South Wales, Australia Filed Jan. 18, 1963, Ser. No. 253,027
Claims priority, application Australia, Nov. 9, 1962, 24,142/62
3 Claims. (Cl. 235—92)

This invention relates to telephone registers or call meters and has particular reference to relay mechanisms for actuating such registers.

It is known to construct registers in which a solenoid type of electro-magnet in response to pulses representing telephone call units to be counted, operates a rotating type of armature which in turn operates an oscillating escapement which intermittently drives a star wheel which in turn rotates into successive positions a drum which bears indicia representing single digits. A set of such drums may be interconnected so as to provide a so-called Veeder-type counter which is capable of indicating say, tens, hundreds and thousands of movements of the escapement, and thus providing an indication of the accumulated number of pulses which have been fed to the electromagnet. The components of such systems are customarily housed in metal cases of rectangular section, over which a closely fitting protecting cover may be slid.

The known apparatus above described has been found, however, to suffer from various disadvantages. For example, the cost of such apparatus is high, largely owing to the number of handling processes, such as stamping, counter-sinking and plating with corrosion-resistant layers or films, in addition to the extra inspections which are necessary to check for any damage in the plating which can result from further handling after the plating has been carried out. Furthermore, the accuracy of the final product is dependent upon the accuracy of fitting of the various components during assembly, and in order to assemble a product of good quality and hence high reliability, additional costs are incurred.

It is an object of the present invention to overcome the above and other disadvantages. In particular, a further object is to reduce the size of telephone registers by reducing the size of their solenoids, thus effecting economies by reducing the size of the buildings necessary to house the telephone exchanges and other equipment which incorporate the registers.

In accordance with the invention in one of its aspects, therefore, a telephone register comprises an electro-magnet whose solenoid actuates a reciprocating armature adapted upon the receipt of pulses by said electromagnet to operate an escapement formed from plastic material, so that said escapement rotates a counter drum of said register intermittently in response to said pulses, said electro-magnet and said escapement being aligned with respect to each other, and with respect to a moulded thermoplastic case, upon insertion within said case.

Certain embodiments of the invention will now be described with reference to the accompanying drawings, in which similar references indicate corresponding parts, and in which:—

Figures 1, 2, 3:
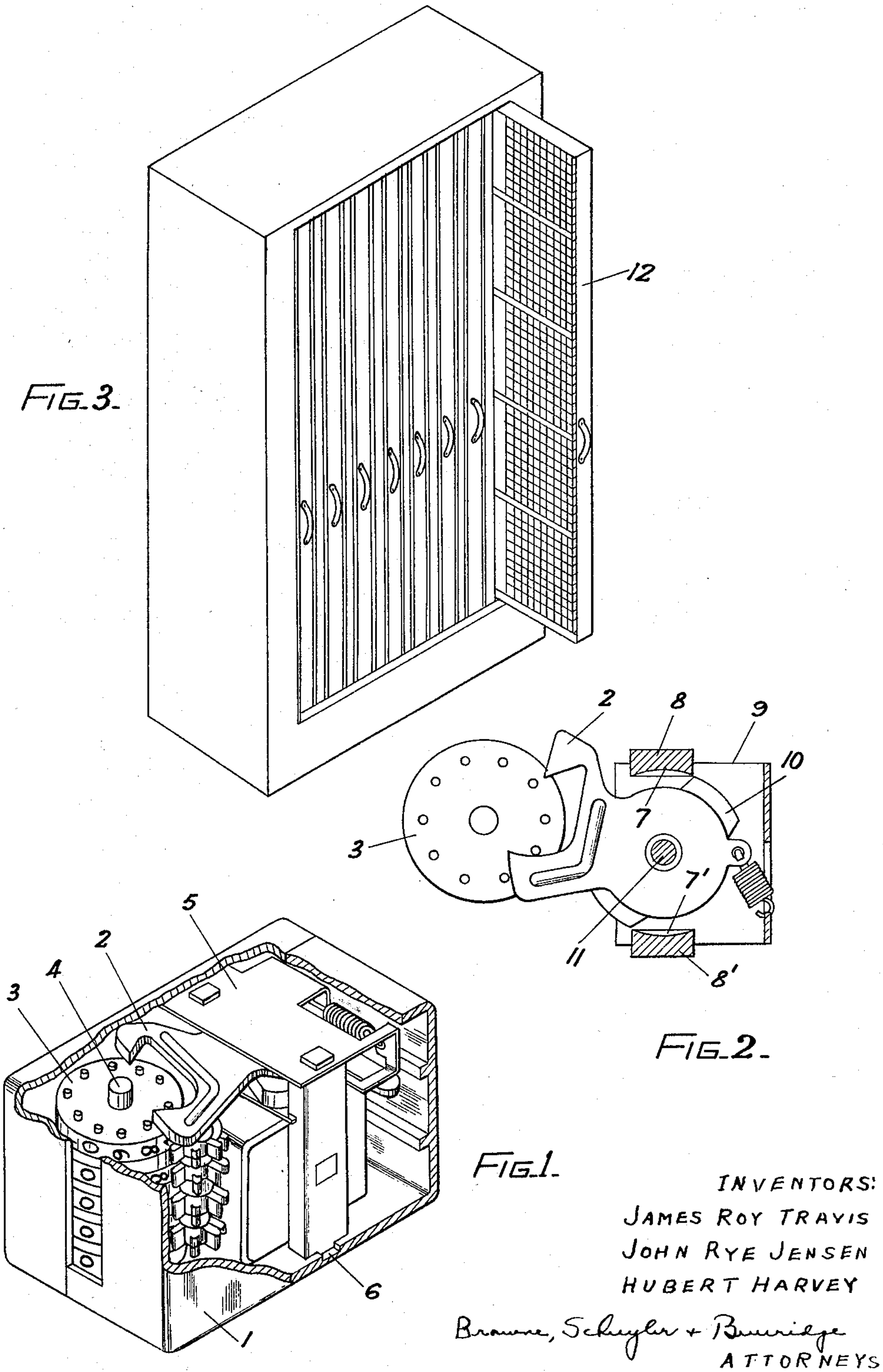
FIG. 1 shows, partly in section, a telephone register constructed in accordance with the invention.
FIG. 2 shows in elevation, and partly in section, details of a reciprocating armature coacting with a counter drum of the register of FIG. 1.
FIG. 3 shows a rack mounting arrangement for a number of the telephone registers of FIG. 1.

Referring now to the drawings, a case 1 is constructed from so-called "nylon 11" and is moulded in a suitable die. A similar material is used to construct the escapement 2 and the counter drum 3. The tolerances of said plastic parts are thus dependent entirely upon the accuracy of construction of dies before the commencement of production and assembly of the registers. In particular, the location of the metal shaft 4 upon which the drum 3 rotates, and also the location of the sub-assembly 5, which includes the electro-magnet, is facilitated by the preforming of keyways such as 6 upon the interior surfaces of the case. A similar keyway, not shown, is provided for the location of the shaft 4. The use of "nylon 11" is preferred since the elasticity of this material permits re-entrant keyways, (suitable for the location of shafts and other supports) to be stripped from a mould and yet still be capable of achieving a snap fit with respect to other coacting elements during assembly. Hence a minimum amount of handling is necessary, and furthermore, no plating of metallic parts is required in order to resist corrosion.

The invention overcomes a further difficulty encountered in the magnetic circuits of prior systems using electro-magnets of the kind shown generally at 5 in FIG. 1. In one known system, the moving parts, that is to say, the armature, the escapement and the associated unit wheels of the counter are located relatively to each other by means of a single plate formed from brass or the like. The stationary limbs of the magnetic circuit are horseshoe shaped so that the armature may oscillate between them. The limbs of the horseshoe are formed from steel or other suitable magnetic material by stamping. For example, one limb may be stamped from a flat member and another limb may be stamped from a similar member of approximately double the length and then bent in one operation into the shape of an L. A tongue may be formed so as to protrude from one end of the L and thus penetrate a hole or keyway formed in the first-mentioned flat member, whereupon an outermost portion of the tongue which protrudes through said keyway may be swaged over so as to attach the members rigidly to each other in a horseshoe pattern. The extremities of the horseshoe so formed may then act as pole-pieces, and it has been found desirable to give the inwardly facing surfaces of such pole-pieces a circular form so as to lie close to the coacting portions of a rotating armature. Since the machining or other fabrication of such pole-pieces is expensive, attempts have been made to reduce costs by giving the outermost ends of said armature a circular configuration which just clears the closest portion of the inwardly facing flat surfaces of said pole-pieces. This expedient has been found, however, to waste the magnetic material employed, since more of it is needed in the magnetic circuit to give a suitably high flux when the gap is not of optimum shape.

Thus, in a preferred embodiment of the present invention, best shown in FIG. 2, the faces 7 and 7' of the pole-pieces 8 and 8' are coined into a circular profile during the stamping process which forms the parts of the magnetic circuit. This has been found to be cheaper either than machining the faces or resorting to the expedient of using a larger quantity of unformed magnetic material as above described. The frame 9 in which said pole-pieces are assembled is preferably formed from nickel silver in its entirety. This material has been found to be more corrosion-resistant than the brass plate used to form this portion of the apparatus in prior systems.

Preferably also a portion of the nylon escapment 2 acts as a bearing and mounting for the magnetic material of the armature 10. That is to say, a portion of the escapement extends through the axis of rotation of the armature to constitute a nylon bearing 11 which is selflubricating and which thus possesses a relatively long trouble-free life.

In one practical embodiment of the invention, a bearing of this type has been found to suffer only three-tenths of a thousandth of an inch in wear after ten million operations of the escapement and to thus provide a more reliable system than those employed in the prior art in which the armature has been secured directly to a metallic shaft, thus increasing its susceptibility to both mechanical wear and the damage which is believed to result from fretting corrosion caused by the magnetic attraction between moving parts.

It will be seen that apparatus constructed in accordance with the present invention may be reduced considerably in size and weight since it does not possess a metal frame, and it is therefore unnecessary to mount one casing unit within another. In particular, the total weight and length respectively have, in one satisfactory example, been reduced to one and one-third ounces and one and eleven-sixteenth inches, whereas a standard P.M.G. type apparatus for carrying out a similar function weights five ounces and is three and three-quarter inches in length.

It will be seen therefore that as well as improving the reliability and accuracy of telephone registers or call meters, and thus giving them a greater appeal to telephone subscribers, the invention also results in great economies which may be effected by the suppliers of telephone services, since smaller buildings will suffice to house the substantially miniaturised equipment. In this respect the invention is particularly adapted to permit the employment of printed circuitry and new rack mounting techniques for call meters.

One such rack-mounting assembly is shown in FIG. 3. Here, a number of the meters above described may be mounted in a sub-assembly 12 having the general nature of a "book." The meters (in this case, five hundred in number) are mounted with the window or slot, through which the indicia of the counter drum 3 may be observed, facing to one side of the sub-assembly. Each "book" may thus be mounted in a slot from which it may be withdrawn by sliding so far as the associated wiring of the meters will allow, and if necessary, photographed or otherwise observed before being restored to a rest position in its slot, whereupon other said "books" may be withdrawin in turn for a similar purpose. In this way it has been found possible to install four thousand said meters in the same space as that previously occupied by one thousand P.M.G. type meters mounted in a standard rack.

We claim:

1. In a telephone register of a reduced size comprising a case and a counter mounted within said case, the improvement comprising a sub-assembly which is mounted within said case and which comprises an electro-magnet having circular pole pieces, a plastic armature having an escapement and shaft integral therewith, and magnetic material mounted on said armature, said armature in respone to electrical pulses oscillating said escapement which intermittently drives said counter.

2. The register of claim 1 wherein the plastic of the armature, escapment and armature shaft is nylon.

3. In a telephone register of a reduced size comprising a case and a counter mounted within said case, the improvement comprising a sub-assembly which is mounted within said case and which comprises an electro-magnet having circular pole pieces, a plastic armature having an escapement and shaft integral therewith, magnetic material mounted on said armature, and spring means for controlling movement of the armature, said armature in response to electrical pulses oscillating said escapement which intermittently drives said counter.

FOREIGN PATENTS 772,055 3/1957 Great Britain.

OTHER REFERENCES

"Pic" catalog E100–A, 1958, published by Production Instrument Co. 710 W. Jackson Blvd., Chicago 6, Ill., 235/92 M1, 8 pp., p. 3 relied on.

MAYNARD R. WILBUR, *Primary Examiner.*

JOHN F. MILLER, *Examiner.*